March 17, 1959 H. M. CROW 2,878,062
ROTARY FLUID COUPLING APPARATUS FOR SPRINKLERS AND THE LIKE
Filed May 21, 1954 3 Sheets-Sheet 1
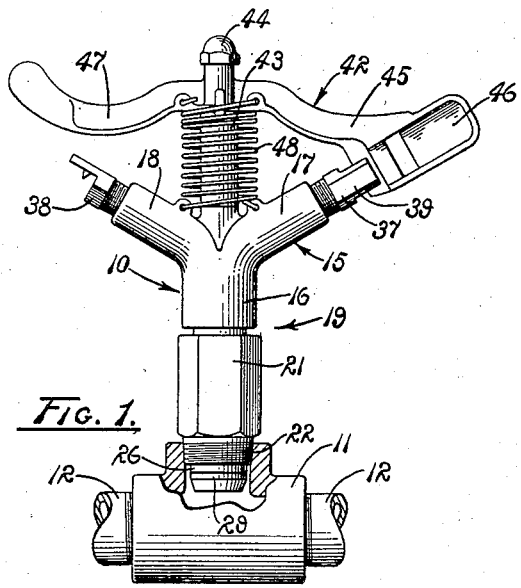
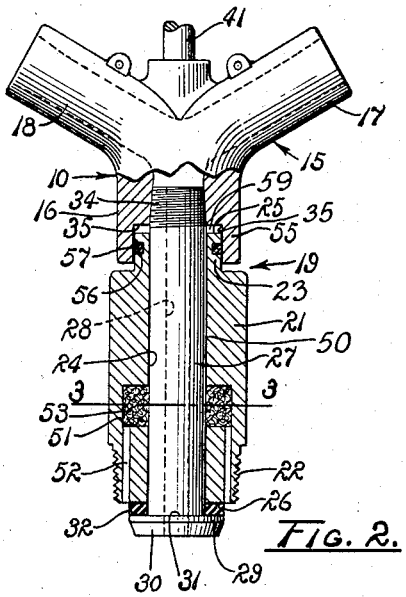
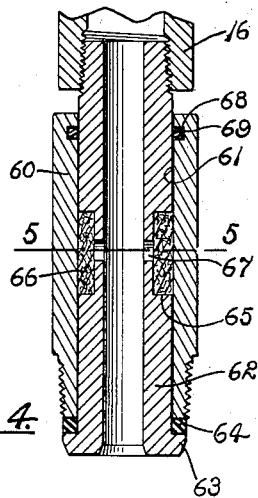
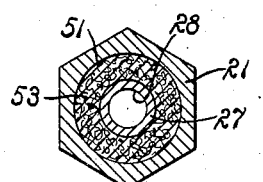
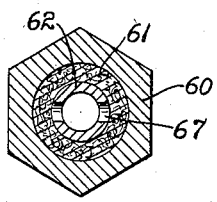
HOWARD M. CROW
INVENTOR
HUEBNER, BEEHLER,
WORREL & HERZIG
ATTORNEYS
BY March 17, 1959 H. M. CROW 2,878,062
ROTARY FLUID COUPLING APPARATUS FOR SPRINKLERS AND THE LIKE
Filed May 21, 1954 3 Sheets-Sheet 2

HOWARD M. CROW
INVENTOR
HUEBNER, BEEHLER,
WORREL & HERZIG
ATTORNEYS
BY

March 17, 1959  H. M. CROW  2,878,062
ROTARY FLUID COUPLING APPARATUS FOR SPRINKLERS AND THE LIKE
Filed May 21, 1954  3 Sheets-Sheet 3

HOWARD M. CROW
INVENTOR
HUEBNER, BEEHLER,
WORREL & HERZIG
ATTORNEYS
BY

United States Patent Office 2,878,062
Patented Mar. 17, 1959

2,878,062

ROTARY FLUID COUPLING APPARATUS FOR SPRINKLERS AND THE LIKE

Howard M. Crow, Lindsay, Calif.

Application May 21, 1954, Serial No. 431,537

9 Claims. (Cl. 299—69)

This invention relates to improvements in pipe connections and more particularly to pipe connections for water sprinklers.

Water sprinklers of the rotating type are of various forms. Some of these provide for interrupted or step by step rotation of the sprinkler head on the shank of the sprinkler and others provide constant rotation of the sprinkler head. In most instances, rotation of the sprinkler head results from a reaction force of water being discharged through a jet nozzle on the sprinkler. The shanks of such rotary sprinklers usually comprise two coaxial tubular members one of which is rotatable with respect to the other whereby the adjacent surfaces of the members constitute bearing surfaces. In many instances gaskets have been provided between portions of such bearing surfaces. Sprinklers of the rotary type are susceptible to receiving sand and grit particles between their bearing surfaces whereby their efficiency becomes greatly impaired and any gaskets therein soon become worn.

It is an object of this invention to provide a pipe connection having one element thereof rotatable with respect to another element thereof wherein the bearing surfaces of the elements are lubricated by fluid being conveyed to the pipe connection.

Another object of the invention is to provide a pipe connection of the above mentioned character in which the fluid for lubricating the bearing surfaces thereof is filtered prior to being passed to the bearing surfaces.

A further object of the invention is to provide a pipe connection of the above mentioned character having a seal for preventing escape of fluid from between bearing surfaces.

Another object of the invention is to provide a pipe connection that is especially suited for use in rotating sprinklers and is adapted to keep the bearing surfaces of a sprinkler free from sand and grit particles.

Further objects and advantages of the invention will appear during the course of the following part of this specification wherein the details of construction and mode of operation of several embodiments of the invention are described with reference to the attached drawings in which:

Fig. 1 is an elevation of a rotary water sprinkler embodying the invention and attached to a fluid supply pipe.

Fig. 2 is an enlarged view of the shank portion of the sprinkler with the lower part of the shank showing a portion thereof in longitudinal section.

Fig. 3 is a transverse section taken on line 3—3 of Fig. 2.

Fig. 4 is a fragmentary longitudinal section of a sprinkler shank of modified form.

Fig. 5 is a transverse section taken on line 5—5 of Fig. 4.

Figure 7:
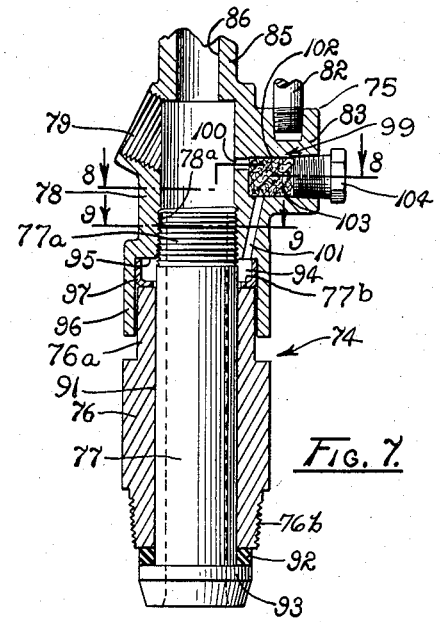
Fig. 7 is an enlarged fragmentary longitudinal section of the body portion of the sprinkler shown in Fig. 6.
Figure 8:
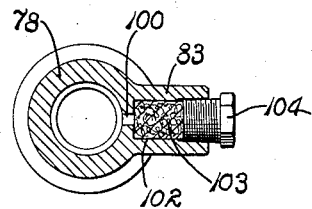
Figure 9:
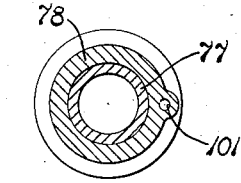

Figs. 8 and 9 are transverse sections taken on lines 8—8 and 9—9, respectively, of Fig. 7.

Figure 10:
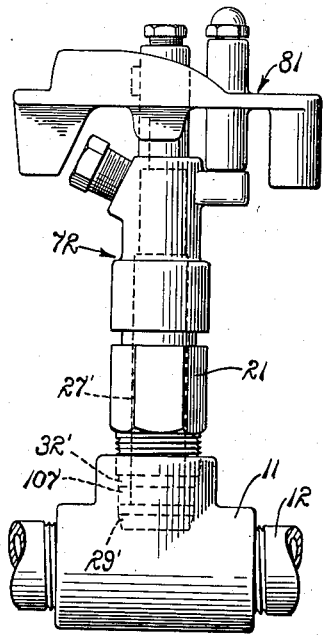

Fig. 10 is an elevation of still another form of a sprinkler embodying the invention.

Figure 11:
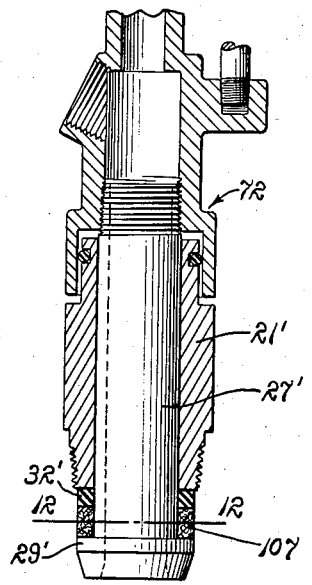

Fig. 11 is an enlarged fragmentary longitudinal section of the body portion of the sprinkler shown in Fig. 10.

Figure 12:
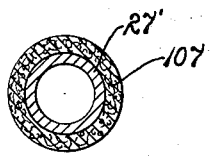

Fig. 12 is a transverse section taken on line 12—12 of Fig. 11.

Referring in greater detail to the drawings:

Reference numeral 10 designates a rotary-type water sprinkler attached to a T-fitting 11 of a pipe or conduit 12 that serves to conduct water under pressure to the sprinkler. In most instances of use the sprinkler is attached to a flexible garden hose rather than being arranged in a relatively stationary position as is suggested by the illustrated T-fitting and pipe connection; however, the fixed pipe 12 has been chosen for illustrative purposes because it serves not only as a suitable water conduit but also as a support for holding the sprinkler in upright position.

The water sprinkler 10 includes a rotatable distributing head 15 having a leg 16 and two arms 17 and 18 extending outwardly and upwardly from the leg as in a Y. The leg and arms are tubular members and are regarded as a fluid discharge portion or portions. For convenience in description, the leg 16 is referred to herein as constituting the upper portion of a shank for the sprinkler, which shank is designated generally by reference numeral 19. The tubular leg constitutes a lower open female end of the head. The lower portion of the shank includes an outer tubular mounting member or portion in the form of a sleeve or bushing 21 having an externally threaded lower mounting end as shown at 22 for fastening the sleeve in the fitting 11 and an upper male end 23 of reduced diameter. The sleeve preferably has a non-circular outer surface and in the embodiment illustrated is of hexagonal form for receiving the jaws of a wrench for tightening the sleeve into the fitting.

The sleeve 21 provides a central cylindrical bore 24 extending axially therethrough and has an upper or top annular end face 25 and a lower annular end face or bearing surface 26. The sleeve bore receives an inner cylindrical hollow tubular stem on member 27 rotatable in the sleeve and having an axial fluid conducting bore 28 extending therethrough. The stem is of greater axial length than the sleeve and thus it extends beyond each end face of the sleeve. On its lower end the stem has an annular flange 29 providing an exposed end face 30 and a shoulder 31 facing upwardly in a direction toward the lower end face of the sleeve. Interposed the lower end face of the sleeve and the shoulder of the flange is a suitable packing gasket, ring, or other fluid seal or packing means, 32 formed of rubber or the like. The lower end of the stem constitutes an inlet in fluid communication with the pipe 12.

At a top male discharge end and around the external surface thereof the stem 27 is provided with screw threads 34 for attaching the leg 16 of the sprinkler head 15 to the stem. In the form of the invention illustrated in Figs. 1 and 2, the sprinkler head provides a female counterbore 35 slidably mounted on the stem so that an inner or end face 36 of the bore is spaced slightly above the upper annular end face 25 of the sleeve 21 whereby the stem may be moved axially in the sleeve to a limited extent.

The arms 17 and 18 provide outer ends which carry jet nozzles 37 and 38 respectively. Arms 17 and 18 and leg 16 are hollow for conveying water from the stem 27 to the nozzles 37 and 38. Nozzle 37 has a projecting portion 39 extending outwardly from the end of the nozzle and the function of the projecting portion will be described below.

Projecting upwardly from the center of the Y formed by the arms 17 and 18 and the leg 16, is a post 41 for rotatably supporting a swinging assembly designated generally by numeral 42. Such assembly includes an elongated central hub 43 journaled on the post and retained by means of a nut 44. Integral with the hub, and extending outwardly therefrom, is a horizontal arm 45 having a vane structure 46 on its outer end and arranged to rest normally against the projection 39 on the nozzle 37. There is a weight arm 47 integral with the hub and extending in a direction opposite to that of the arm 45 so that it constitutes a counterbalance for the arm 45. A torsional spring 48 is arranged around the hub 43 to swing the assembly in a direction such that the vane structure will normally rest against the projection 39.

As thus far described, the sprinkler is similar to that illustrated and described in the United States Letters Patent No. 1,997,901, entitled "Water Sprinkler," and issued to Orton H. Englehart on April 16, 1935. As explained in that patent, when water is admitted to the sprinkler, the discharge of water from the nozzle 37 will strike against the vane structure causing the vane to swing in an arc away from the jet nozzle. The length of the arc traveled by the vane structure depends upon the resistance offered by the torsional spring 48, the total weight of the swinging assembly, and upon the force of water issuing from the jet nozzle. When the swinging assembly moves in a direction so as to separate the vane from the jet nozzle, the body of the sprinkler remains still rather than moving along with the vane. This tendency of the body of the sprinkler to remain still and to allow the vane to swing away from the jet nozzle 37, results from making the torsional spring 48 of less strength than the frictional resistance offered by the gasket 32 against rotation of the stem in the sleeve. This frictional resistance of the gasket is developed by pressure of water passing through pipe 12 and being exerted against the exposed end face 30 of the flange 29 thus providing an upward thrust on the flange toward the lower end face 26 of the sleeve. When the inertia of the swinging assembly is expended, the torsional spring rotates the assembly in a direction moving the vane toward the jet nozzle 37 whereby the vane cuts through the jet nozzle and finally strikes against the projection 39, thereby causing the entire sprinkler to rotate upon its stem for a relatively small portion of a complete rotation.

Water sprinklers of the above described type and those that provide for uninterrupted rotation as well, are greatly susceptible to having sand and grit particles enter between the bearing surfaces of the sprinkler, i. e., between the outer surface of the stem 27 and the inner surface defining the bore 24 of the sleeve 21 and also between the surfaces bearing against the gasket 32. Such sand and grit particles enter the bearing surfaces not only from externally of the sprinkler, but also from the water which passes through the sprinkler and carries grit particles with it. These grit particles greatly impair the efficiency of the sprinkler preventing the desired rotation of the stem in the sleeve and also causing substantial wear on the surfaces of the gasket and improper functioning of the gasket.

The present invention provides a structure which prevents entry of sand and grit into or between the bearing surfaces of the sprinkler. To this end, the diameter of the sleeve bore 24 is made slightly larger than that of the stem 27 by an amount of approximately six to eight thousandths of an inch to define therebetween an annular lubricating chamber 50. In the form of the invention illustrated in Fig. 2, an annular passage or groove 51 is formed in the inside wall of the sleeve 21 so that it opens or communicates with the thin lubricating space or chamber between the stem and the sleeve. The sleeve contains a plurality of peripherally spaced fluid passageways 52 extended in parallel relation to the bore 24 and providing for the flow of water from within the pipe 12 to the groove 51. In the groove is an annular filter 53 formed of steel wool, glass wool, or the like. Water enters into the space between the stem and the sleeve by passing upwardly through the passageways 52 and through the filter 53. The shank 19, the gasket 32 and the filter 53 constitute an outer tubular wall.

The upper end 23 of the sleeve 21 accommodates an annular skirt 55 depending from the leg member 16 in circumscribing relation to counterbore 35. Around the reduced portion of the sleeve is an annular groove 56 which receives an O-ring 57 of suitable material such as rubber, for example. The outer periphery of the O-ring 57 engages the inside wall of the skirt 55 thus forming a seal which prevents water from passing outwardly from between the stem and the sleeve. When the space between the stem and the sleeve is filled with water the sprinkler has a fluid-type bearing wherein the stem 27 rotates within a thin film of water covering the inside surface of the sleeve. The thin space provided between the outer surface of the stem and the inside wall of the sleeve 21, constituting the lubricating chamber 50, extends downwardly to the lower end of the sleeve. Pressure of water within the lubricating chamber will thus be exerted radially outwardly between the end faces of the gasket 32 and the end faces 26 and 31 of the sleeve and the flange 29 on the stem, respectively, and it is equal to or greater than the pressure of the water flowing through pipe 12, whereby it prevents entry of water from the pipe 12 into the lubricating chamber from around the gasket.

In the above explanation of the manner in which the water sprinkler 10 illustrated in Fig. 1 operates, it was pointed out that backward rotation of the body of the sprinkler is prevented by the frictional resistance offered by the gasket 32. In the form of the invention illustrated in Fig. 2, the annular skirt 55 provides a pressure chamber 59 which, when filled with fluid, exerts an upward pressure against the end face 35 of leg 16, thus urging the stem 27 upwardly in the sleeve 21 and increasing the upward thrust of the flange 29 into tight frictional engagement with the annular gasket 32, thereby increasing the tendency of the body portion of the sprinkler to remain stationary during that period of time in its operation when the swinging assembly 42 is moved away from the jet nozzle 37.

In Fig. 4, the lower portion of a modified shank shown therein includes an outer tubular sleeve or member 60 having opposite ends and an axial bore 61 extending therethrough for receiving a stem 62 having opposite ends, and a flange 63. An annular gasket or fluid seal 64 is provided at its lower end. The form of the invention shown in Fig. 4 differs from that shown in Figs. 1 to 3, in that the inner tubular stem or member 62 has an annular passage 65 formed in and around its external surface for receiving an annular filter 66. The passage 65 opens into the thin annular chamber defined between adjacent bearing surfaces of the sleeve and the stem. Water enters the passage 65 and passes through the filter 66 into the chamber around the stem through a plurality of radially directed passage apertures 67 extending through the wall of the stem. The sleeve 60 is provided near its top end with an annular groove 68 for receiving an O-ring or fluid seal 69 the inner periphery of which bears against the outer surface of the stem 62 thus forming a seal which prevents escape of water outwardly from the top of the sleeve. As in the embodiment described above, the bearing surfaces of the stem 62 and the sleeve 60 are maintained free of sand and grit particles by means of the filter 66. Also, the bearing surfaces of the gasket or fluid seal 64 are maintained free of dirt and grit due to the counter pressure of water exerted from within the sleeve and outwardly around the gasket preventing entry of water from a supply pipe to the bearing surfaces of the gasket.

In the modification illustrated in Figs. 6 to 9, inclusive, a rotary sprinkler 72 is shown standing upright on a T-fitting 73 of a water supply pipe 12a. The sprinkler 72 includes a shank 74 and a sprinkler head 75. The shank 74 includes a mounting portion in the form of a sleeve 76, and a tubular stem 77 is rotatable in the sleeve; further, the shank includes a hollow body part 78 integral with the sprinkler head having a female threaded bore 78a fastened on a threaded male top discharge end 77a of the stem. The stem has an upper radially disposed annular end face 77b. There is a tapped opening 79 in the body part 78 communicating with the hollow of the body part and receiving a jet nozzle 80 for discharging water conveyed through the tubular stem upwardly from its lower inlet end in communication with the supply pipe and into the body part. The body part 78 is thus a fluid discharge portion. The sprinkler head includes a swinging assembly 81 pivotally mounted on a post 82 standing upright from an enlarged portion 83 integral with the wall of the body part. As believed understood, the sleeve or mounting portion has a lower externally threaded mounting end 76b rigidly connected in the T-fitting.

The top end of the body part 78 includes an extension 85 having an axial bore 86 closed by a plug 87. A jet 88 is formed in the wall of the extension 85 for discharging water so that the water will strike against vanes 88 arranged one on each side of the swinging assembly to cause reciprocative movement of the assembly and to impart interrupted rotation of the head and stem in the sleeve. Reference numeral 90 designates a vane for cutting the stream of water from nozzle 80 each time the swinging assembly is pivoted back and forth on the post 82.

As in the previously described forms of the invention, the sleeve 76 has a central cylindrical bore axially extended therethrough slightly larger in diameter than the outer diameter of the stem 77, so as to form a lubricating chamber 91 between adjacent walls of the stem and sleeve. The lower end of the lubricating chamber is closed during operation of the sprinkler by a packing gasket, or other fluid seal, 92 around the stem and positioned between the lower end face of the stem and the upper face of a flange 93 on the lower end of the stem. The top end of the lubricating chamber opens into a pressure chamber 94 defined around the stem by the upper end face of the sleeve, a lower end or inner face 95 of the body portion 78, and an annular collar or skirt 96, constituting a female attaching portion, integral with the body portion and slidably fitted over the male top end 76a of the sleeve. As the stem is axially slidable in the sleeve, the end face 95 constitutes a moveable wall for the pressure chamber 94 allowing the pressure chamber to be expanded by the pressure of water in it. There is a fluid sealing ring 97 engageable with the inside wall of collar 96 and the top end face of sleeve 76 for sealing the pressure chamber against flow of water out around the upper part of the sleeve.

In this form of the invention water is admitted to the pressure chamber 94 and to the lubricating chamber or space 91 between adjacent surfaces of the stem 77 and sleeve 76 by a passage 99 which is in fluid communication with the bore 78a of the body portion 78. This passage comprises a bore 100, a bore 101 and a cavity 102 formed in the enlarged portion 83. Sand and grit particles are prevented from entering the pressure chamber 94 by means of a filter 103 which fills the cavity 102 and is retained in the cavity by a screw-threaded plug 104. The shank 74, the gasket 92 and the filter 103 constitute an outer tubular wall.

Figure 6:
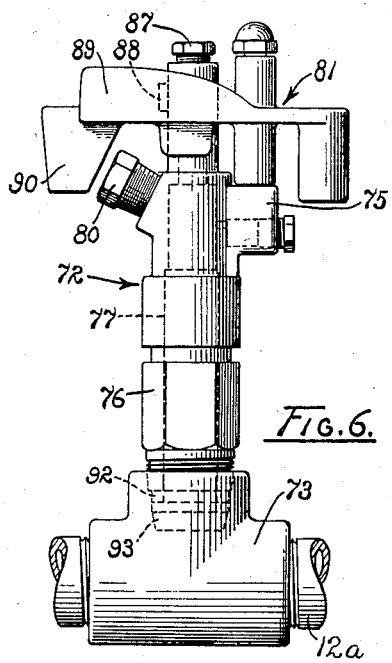
Fig. 6 is an elevation of another rotary water sprinkler embodying the invention.

Referring now to Figs. 10 to 12, inclusive, the modification shown therein includes a sprinkler head of the type shown in Fig. 6. The shank of the modification to be presently described is similar in structure to that shown in Fig. 2 except that instead of having a filter arranged in the inside wall of the sleeve 21 of Fig. 2 there is an annular filter 107 around the stem 27' and arranged between a flange 29' and an annular gasket 32'. Thus, in modification shown in Figs. 10 to 12, water from a supply pipe passes into the thin annular chamber between the outer surface of the stem 27' and the inside surface of the sleeve 21' through the filter 107 which is in communication with the chamber. The shank of Figs. 10–12, the gasket 32', and the filter 107 constitute an outer tubular wall.

As used herein the expression "fluid intercepting means" includes the packings 32, 64, or 92; or both the packing 32' and the filter 107; or their equivalents.

In view of the above description, it is seen that the present invention provides a pipe connection in which one tubular part thereof (i. e. stem 27) is rotatable in another part (i. e. sleeve 21) and in which a closed lubricating chamber between adjacent walls of these parts is formed and adapted to be filled with filtered fluid bypassed from the main portion of the stream of fluid passing through the pipe connection.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and structures.

Having described my invention, what I claim as new and desire to secure by Letters Patent is:

1. In a rotary fluid coupling apparatus, an elongated sleeve having a central bore and a predetermined mounting end, a tubular stem fitted in the bore for rotation therein relative to the sleeve and defining an annular lubricating chamber between the stem and the sleeve, a fluid supply conduit, the mounting end of the sleeve being connected to the fluid supply conduit with said mounting end and the tubular stem being in fluid communication with the fluid supply conduit, packing means positioned between the sleeve and the stem at the mounting end of the sleeve defining an end to the lubricating chamber, the sleeve having a passage therein in communication with the fluid supply conduit and opening into the lubricating chamber on the opposite to the packing means from the fluid supply conduit, and filter means disposed in the passage of the sleeve.

2. In a sprinkler apparatus, a fluid supply conduit adapted to supply fluid under pressure; an elongated sleeve having a mounting end rigidly connected to the supply conduit, a male fitting end and a central bore axially extended therethrough; an elongated stem rotatably fitted in the central bore of the sleeve having an axially extended fluid conducting bore therethrough and providing an inlet end in fluid communication with the supply conduit and a male discharge end endwardly extended from the male fitting end, the stem being minutely spaced from the sleeve to define therebetween an elongated annular lubricating chamber; a rotatable sprinkler head mounted over the male discharge end of the stem for rotation therewith and having a female portion extended over the male end of the sleeve for rotation relative thereto; means providing a fluid seal between the stem and the sleeve and adjacent to the inlet and mounting ends thereof respectively; means providing a fluid seal between the male end of the sleeve and the female portion of the sprinkler head, the sleeve having a fluid passage in communication with the fluid supply conduit and the lubricating chamber intermediate the fluid seal means; and a filter body mounted in the passage in spaced relation to the fluid supply conduit.

3. A sprinkling apparatus comprising an elongated sleeve having a central bore, a predetermined mounting end and an oppositely extended male fitting end, the mounting end having an annular axially disposed end face thereon; an elongated stem rotatably and longitudinally slidably fitted in the central bore providing a fluid conducting bore extended therethrough, a predetermined inlet end, and an outlet end, the inlet and the outlet ends being extended endwardly from the mounting and fitting ends of the sleeve, respectively, the stem having an annular end flange radially extended from the inlet end thereof in parallel spaced relation to the annular end face of the sleeve; a rotatable sprinkler head mounted over the male end of the stem for rotation therewith and having a female portion extended over the male end of the sleeve for rotation relative thereto; an annular fluid seal and thrust washer interposed the annular end face and the annular flange in circumscribing relation to the stem; an annular fluid seal interposed the male end of the sleeve and the female portion of the sprinkler head, the stem and sleeve defining therebetween an elongated annular lubricating chamber intermediate said fluid seals, the sleeve having a passage therein from the axially disposed end face outwardly of the fluid seal and thrust washer to the lubricating chamber; and filter means mounted in the passage of the sleeve.

4. A fluid coupling unit comprising an elongated sleeve having a central bore, a predetermined mounting end and an oppositely extended male fitting end, the mounting end having an annular axially disposed end face thereon; an elongated stem rotatably and longitudinally slidably fitted in the central bore of the the sleeve providing a fluid conducting bore extended therethrough, a predetermined inlet end, and an outlet end, the inlet end and the outlet end being extended endwardly from the mounting and fitting ends of the sleeve respectively, the stem having an annular end flange radially extended from the inlet end of the stem in parallel spaced relation to the annular end face of the sleeve; an annular fluid seal and thrust washer interposed the annular end face and the annular flange in circumscribing relation to the stem; an annular fluid seal in circumscribing relation to the stem longitudinally thereof from the fluid seal between the annular flange and end face, the stem and sleeve defining therebetween an elongated annular lubricating chamber intermediate said fluid seals and the sleeve having an internal annular groove in fluid communication with the lubricating chamber and a plurality of elongated passageways longitudinally extended from the groove to the annular end face adjacent to the mounting end of the sleeve; a filter body mounted in the groove in circumscribing relation to the stem; and a fluid supply conduit mounting the sleeve therein with the fluid conducting bore of the stem and the passageways of the sleeve in fluid communication therewith.

5. In a sprinkler apparatus; a fluid supply conduit adapted to supply fluid under pressure; an elongated shank having a fluid discharge portion providing a female end, a mounting portion providing a male end rotatably received in said female end and a mounting end rigidly connected to the supply conduit, and a central bore axially extended through said shank; an elongated stem rotatably fitted in the central bore of the mounting portion of the shank having a fluid conducting bore axially extended therethrough and providing an inlet end in fluid communication with the supply conduit and a male discharge end connected to the fluid discharge portion of the shank, the stem being spaced from the mounting portion of the shank to define therebetween an elongated annular lubricating chamber, means providing a fluid seal between the inlet end of the stem and the mounting end of the mounting portion of the shank; means providing a fluid seal between the male end of the said mounting portion and the female end of the fluid discharge portion of the shank, the fluid discharge portion of the shank having a fluid passage extended from the lubricating chamber between the fluid seal means and opening into the central bore of the shank; and a filter mounted in the passage.

6. The combination of claim 5 including a plug releasably screw-threaded into the passage in compressible engagement against the filter.

7. In a rotary fluid coupling apparatus, an outer tubular member having opposite ends, an inner tubular member rotatably mounted within the outer tubular member and also having opposite ends, the inner and outer tubular members having adjacent opposed respectively outwardly and inwardly disposed bearing surfaces defining a lubricating chamber therebetween extended longitudinally between the ends of the members, a fluid supply conduit mounting the outer member therein with corresponding ends of the members being in communication with the interior of the fluid supply conduit, packing positioned between the bearing surfaces of the members at both ends thereof so as to provide fluid seals at opposite ends of said lubricating chamber, one of said members having a passage therein in communication with the fluid supply conduit and opening into the lubricating chamber between the packing at opposite ends of the chamber, and a filter in the passage for removing foreign particles from fluid entering the chamber through the passage.

8. In a sprinkler apparatus; a fluid supply conduit adapted to supply fluid under pressure; an elongated shank having a fluid discharge portion providing a female end, and a mounting portion providing a male end rotatably received in said female end, the mounting portion having a mounting end opposite to the male end and rigidly connected to the supply conduit, the fluid discharge and mounting portion providing continuous bores therein, the bore in the mounting portion extended axially therethrough; an elongated stem rotatably fitted in the bore of the mounting portion of the shank having a fluid conducting bore axially extended therethrough, an inlet end in fluid communication with the supply conduit, and a male discharge end connected to the fluid discharge portion of the shank, the stem being spaced from the mounting portion of the shank to define therebetween an elongated annular lubricating chamber; fluid intercepting means positioned between the mounting end of the mounting portion of the shank and the inlet end of the stem defining an end to the chamber; packing providing a fluid seal between the male end of the mounting portion of the shank and the female end of the fluid discharge portion of the shank and defining an opposite end to the chamber, one of the shank and the fluid intercepting means providing fluid communication between the chamber and the fluid supply conduit to admit fluid to the chamber.

9. In a sprinkler apparatus; a fluid supply conduit adapted to supply fluid under pressure; a substantially cylindrically fluid discharge member providing a female end; a substantially cylindrical mounting member providing a male end rotatably received in the female end of the discharge member and a mounting end rigidly connected to the supply conduit, the fluid discharge member and the mounting member providing continuous bores therein, the bore in the mounting member extended axially therethrough; an elongated stem rotatably fitted in the bore in the mounting member having an axially extended fluid conducting bore, an inlet end in fluid communication with the supply conduit, and a male discharge end connected to the fluid discharge member, the stem being spaced from the mounting member to define therebetween an elongated annular lubricating chamber; fluid intercepting means positioned between the mounting end of the mounting member and the inlet end of the stem defining an end to the chamber; packing providing a fluid seal between the male end of the mounting member and the female end of the fluid discharge member and defining an opposite end to the chamber, the fluid discharge member, the mounting member, and the fluid intercepting means constituting a tubular wall circumscribing the chamber, said tubular wall providing a fluid passage establishing fluid communication between the conduit and the chamber; and a filter positioned in the fluid passage enabling passage of fluid substantially free of foreign particles from the conduit into the chamber between the packing and the fluid intercepting means.

References Cited in the file of this patent

UNITED STATES PATENTS

| | | |
|---|---|---|
| 988,423 | Wittekopf | Apr. 4, 1911 |
| 1,180,526 | Partridge | Apr. 25, 1916 |
| 1,982,937 | Walter | Dec. 4, 1934 |
| 2,064,072 | McArdle | Dec. 15, 1936 |
| 2,086,515 | Evans | July 6, 1937 |
| 2,212,218 | Whiteley | Aug. 20, 1940 |
| 2,323,701 | Barksdale | July 6, 1943 |
| 2,336,725 | Englehart | Dec. 14, 1943 |
| 2,518,338 | Lampe | Aug. 8, 1950 |
| 2,610,096 | Mallory | Sept. 9, 1952 |
| 2,619,380 | Jepson | Nov. 25, 1952 |

FOREIGN PATENTS

| | | |
|---|---|---|
| 142,205 | Australia | Mar. 10, 1949 |